Patented June 1, 1926.

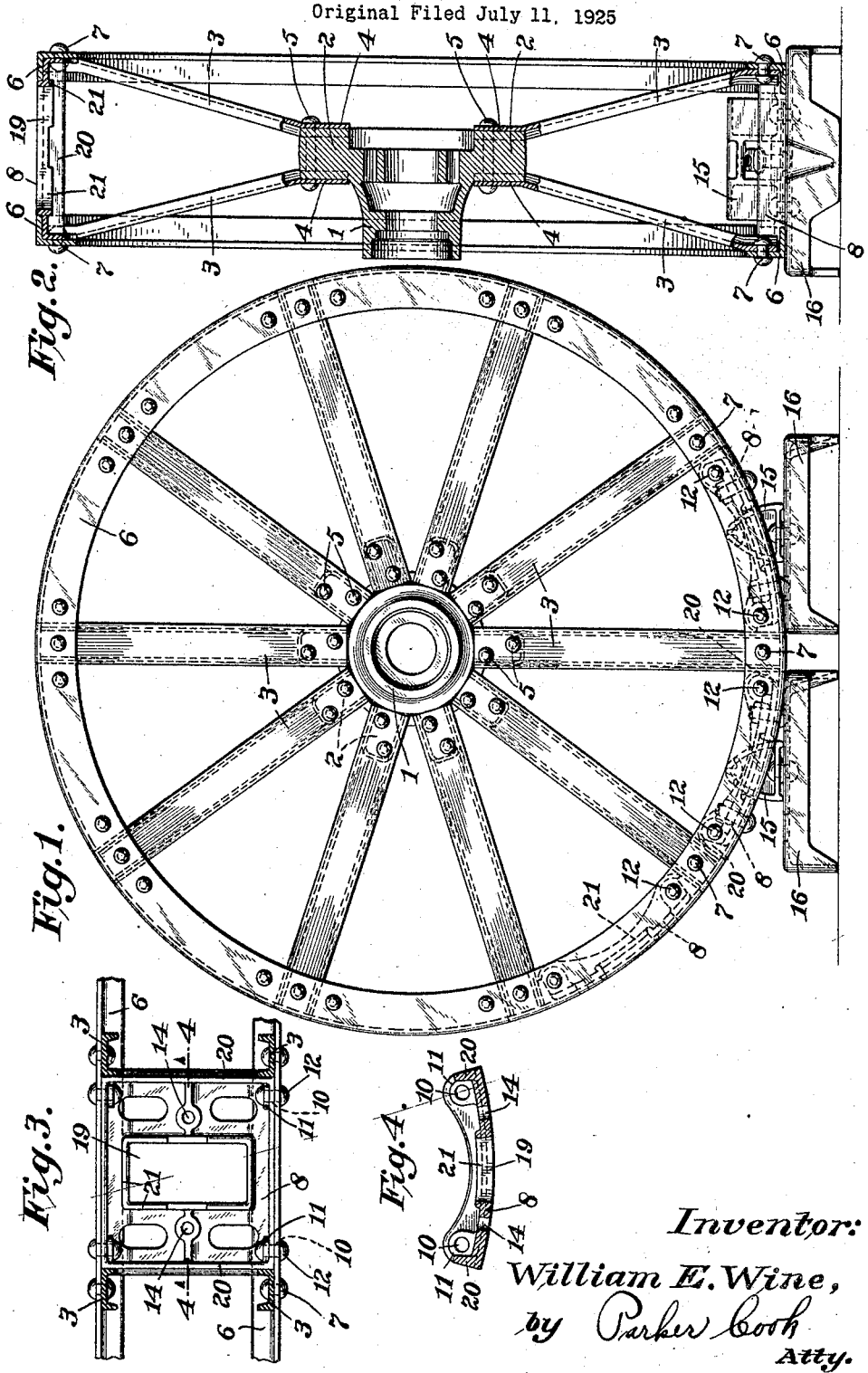

1,587,056

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR WHEEL.

Original application filed July 11, 1925, Serial No. 42,998. Divided and this application filed January 30, 1926. Serial No. 84,883.

My invention relates to new and useful improvements in tractor wheels and more particularly to a tractor wheel which is made up of a hub, a plurality of spokes, and two bands forming a skeleton rim in which are secured a plurality of casings, the said casings being arranged to form a relatively wide rim and at the same time strengthen the wheel as a whole.

The present application is a divisional one, the parent application being filed by me on July 11, 1925, bearing Serial No. 42.998, entitled Tractor wheels.

This divisional application relates to the wheel structure made of the parts above mentioned, the casings which form the rim of the wheel being capable of receiving the form of tractor shoes shown in the parent application, as well as others.

One of the principal objects of the invention is to provide a wheel which may be quickly and readily assembled, the skeleton rim being formed of two angle members in which are placed a number of small casings or housings, the casings arranged to fit within the angle members and be bolted or riveted thereto and the casings at their ends abutting against the respective spokes.

Another object of the invention is to provide a wheel which is very strong, efficient in service, relatively light in weight, and wherein the small casings not only complete the rim, strengthen the wheel as a whole, but also provide means to rockably support a number of tractor shoes.

With these and other objects in view, which will be more fully described as the specification proceeds, the invention consists in certain new and novel constructions and combination of parts as will be hereinafter more fully described and pointed out in the claims.

In the drawings showing a preferred embodiment of my invention, Fig. 1 is a side elevation of my improved tractor wheel, two tractor shoes being shown in position, but these form no part of the present invention.

Fig. 2 is a vertical sectional view of the wheel, showing a shoe at the bottom and one of the casings at the top of the wheel.

Fig. 3 is an inner plan view of the casing, and also showing four spokes in section and fragments of the annuli and Fig. 4 is a sectional view taken on line 4—4 of Fig. 3.

Referring now more particularly to Figs. 1 and 2 of the drawings, there is shown my new improved tractor wheel comprising a hub 1 having the annularly positioned lugs 2 to which in turn are riveted a plurality of metal spokes 3 which are preferably angle bars having their vertical inner portions 4 riveted as at 5 to the said lugs 2, the angles overlapping the sides of the lug.

The main hub portion will be cut out to receive the ordinary form of axle and ball bearing races. The perimeter of the wheel is formed by the two metal bands 6 which are preferably angle irons, one of the legs of each band extending laterally inwardly, while to the inwardly extending main leg of each band is riveted the outer ends of the spokes 3 as may be seen at 7. Any number of spokes may be employed, and the distance between the outer ends of the spokes, determines the length of the housings 8 which are to be secured in the bands 6. In the present instance, I have shown ten pairs of spokes, as I have found that these will provide the desired strength although a greater or lesser number may be used if desired.

Before describing the small housings and the casings in detail, it might be mentioned that these are to be securely riveted within the opposite legs of the bands 6 and abut against the outer ends of the adjacent spokes 3 so that these spokes are not only tightly riveted to the hub, and to the skeleton rim, but are also rigidly held between the end walls of the numerous housings, so that there will be no tendency for a shearing action.

Referring now more particularly to Figs. 3 and 4, it will be seen that each casing comprises a steel casting rectangular in form and slightly convexed on its outer surface, its convexity being of such a degree that ten of them will form the complete perimeter or rim of the wheel. To reduce the weight slightly, the opposite side walls of these casings are cut out as shown, and near their opposite ends are the two small openings 10 reinforced by the bosses 11, so that the rivets 12 may tightly secure the housing within and to the bands 6.

In the drawings there are shown two small openings 14 extending through these casings so that a locking means may be secured to the casing, which locking means is designed to pass through a retaining means 15 to which, in turn, is secured a tread member 16, but the retaining means, locking means and tread member form no part of the present application.

Also formed centrally of the casing 8 is the rectangular opening 19 through which is designed to extend a part of the retaining means 15. The ends of the casings are reinforced as at 20 and it will be noticed that they terminate slightly at a point before the vertical.

The central opening 19 is reinforced by the rim 21, the thickness of this rim on the outer surface of the casing being such that it will lie flush with the outer surface of the bands 6 when the casing is in position as may be seen in Fig. 2.

The width of the casing also is such that it will snugly fit between the angles of the rim so that the rim is braced transversely as well as peripherally when the casings are in position.

From the foregoing it will be seen that I have designed and invented a tractor wheel which is relatively light in weight and wherein a plurality of casings fit within a skeleton rim to form the completed rim. These casings also provide excellent means for supporting rockably tractor shoes and at the same time the casings brace the wheel transversely of the rim between the outer end of the spoke to overcome any shearing action of the spokes.

I am aware that it is old to provide a plurality of casings in a rim, but as far as I am aware these casings do not accomplish all of the desirable functions set out and what I claim as new and desire to secure by Letters Patent is:—

1. A tractor wheel comprising a hub, spokes rigidly attached thereto, two annular bands formed of angle iron spaced from each other, one leg of each band extending toward the other, the other leg of each band extending toward the hub, the said bands forming a skeleton rim, the outer ends of the spokes secured respectively to the said bands, a plurality of casings nested within the said bands, and rigidly secured thereto and tightly abutting respectively the adjacent outer ends of the spokes to thereby provide a rigid structure.

2. A tractor wheel comprising a hub having spaced lugs extending therefrom, spokes rigidly secured to said lugs, two annular bands forming a skeleton rim, said spokes secured at their outer ends to the said rim, each band of the rim being angularly formed, one leg of each band extending towards the other, the other legs extending toward the hub, a plurality of casings fitting within the said bands and having a reinforced opening lying flush with the respective legs that extend toward each other, and the length of each casing being such that its opposite ends abut against the respective spokes to thereby prevent any shearing action in the wheel.

3. A tractor wheel comprising a hub, angularly formed spokes secured to said hub, two bands spaced from each other and forming a skeleton rim for the wheel, one leg of each band extending toward the other, the other leg of each band extending toward the hub, the outer ends of the spokes securely fastened respectively to the leg of each band that extends toward the hub, a plurality of casings nested within the bands, each casing being disposed between the outer ends of two spokes and abutting against the same to thereby brace the wheel as a whole, and each of said casings provided with an opening therein for the reception of a tractor shoe.

4. A tractor wheel comprising a metal hub with spaced lugs, a plurality of pairs of spokes secured to the respective lugs, each of said spokes being semi-boxlike in construction, two angle irons spaced from each other and forming a skeleton rim, the outer ends of said spokes secured to a respective leg of each rim, the other legs of each rim extending towards each other, a plurality of castings nested within said bands and riveted thereto, the opposite ends of each casting abutting against an adjacent leg of two spokes to thereby prevent any shearing action, and each of the casings having a reinforced opening, the reinforcement lying flush with the outer surfaces of the two legs of the bands which extend toward each other.

5. A tractor wheel comprising a skeleton rim, a hub, a plurality of castings fitting within the rim and abutting the outer ends of the respective spokes to thereby add rigidity to the wheels, each of said castings nested within the skeleton rim, a portion of the rim extending across a part of the outer surface of each casing, each of said casings provided with an opening for the reception of a tractor shoe, a rim around the said opening, and the outer edge of the rim lying flush with the outer surface of the skeleton rim.

In testimony whereof I affix my signature.

WILLIAM E. WINE.